United States Patent
Ishizuka et al.

(10) Patent No.: US 9,768,718 B2
(45) Date of Patent: Sep. 19, 2017

(54) MOTOR CONTROL DEVICE, IMAGE FORMING APPARATUS, AND NON-TRANSITORY COMPUTER-READABLE MEDIUM

(71) Applicants: Natsuko Ishizuka, Kanagawa (JP); Tatsuya Watahiki, Kanagawa (JP)

(72) Inventors: Natsuko Ishizuka, Kanagawa (JP); Tatsuya Watahiki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/164,574

(22) Filed: Jan. 27, 2014

(65) Prior Publication Data
US 2014/0219698 A1    Aug. 7, 2014

(30) Foreign Application Priority Data
Feb. 6, 2013  (JP) .................. 2013-021745

(51) Int. Cl.
| | |
|---|---|
| *B41J 15/00* | (2006.01) |
| *H02P 7/00* | (2016.01) |
| *G03G 15/00* | (2006.01) |
| *G05B 19/042* | (2006.01) |
| *B41J 29/38* | (2006.01) |

(52) U.S. Cl.
CPC .............. *H02P 7/00* (2013.01); *B41J 29/38* (2013.01); *G03G 15/6529* (2013.01); *G05B 19/0421* (2013.01); *G03G 2215/00599* (2013.01); *G03G 2215/00603* (2013.01); *G05B 2219/45187* (2013.01)

(58) Field of Classification Search
CPC ........... G03G 2215/00599; G03G 2215/00603
USPC ..... 400/578; 399/76, 388, 394, 78, 281, 297
See application file for complete search history.

(56) References Cited

U.S. PATENT DOCUMENTS

| | | | | |
|---|---|---|---|---|
| 4,669,853 A | * | 6/1987 | Sosinski et al. ............ | 399/11 |
| 5,010,372 A | * | 4/1991 | Kasahara ............ | G03G 15/01 |
| | | | | 399/138 |
| 5,024,541 A | * | 6/1991 | Tsukada et al. .............. | 400/88 |
| 2006/0039019 A1 | | 2/2006 | Okamoto | |

(Continued)

FOREIGN PATENT DOCUMENTS

| | | |
|---|---|---|
| JP | 09-205506 | 8/1997 |
| JP | 2001-309678 A | 11/2001 |

(Continued)

OTHER PUBLICATIONS

Japanese Office Action dated Apr. 18, 2017 for corresponding Japanese Application No. 2013-021745.

*Primary Examiner* — Matthew G Marini
(74) *Attorney, Agent, or Firm* — Harness, Dickey, & Pierce P.L.C.

(57) ABSTRACT

A motor control device includes a first control unit and a second control unit. The first control unit includes an issuing unit that issues a command that schedules a next operation of a motor according to an instruction from a controller. The second control unit includes a receiving unit that receives the command, a detecting unit that detects a state of the motor, a determining unit that makes a determination as to whether to drive the motor to perform the operation according to the state detected by the detecting unit, and an executing unit that drives the motor to perform the operation scheduled by the command as determined by the determination.

22 Claims, 8 Drawing Sheets

(56) References Cited

U.S. PATENT DOCUMENTS

| | | | |
|---|---|---|---|
| 2008/0038004 A1* | 2/2008 | Inoue | 399/45 |
| 2010/0231948 A1* | 9/2010 | Otani et al. | 358/1.14 |
| 2011/0047403 A1* | 2/2011 | Seki et al. | 713/503 |
| 2011/0229164 A1 | 9/2011 | Watahiki | |

FOREIGN PATENT DOCUMENTS

| | | |
|---|---|---|
| JP | 2002-284375 | 10/2002 |
| JP | 2006-56643 A | 3/2006 |
| JP | 2011-215605 A | 10/2011 |

* cited by examiner

MOTOR CONTROL DEVICE, IMAGE FORMING APPARATUS, AND NON-TRANSITORY COMPUTER-READABLE MEDIUM

CROSS-REFERENCE TO RELATED APPLICATIONS

The present application claims priority to and incorporates by reference the entire contents of Japanese Patent Application No. 2013-021745 filed in Japan on Feb. 6, 2013.

BACKGROUND OF THE INVENTION

1. Field of the Invention

The present invention relates to a motor control device, an image forming apparatus, and non-transitory computer-readable medium.

2. Description of the Related Art

An image forming apparatus, such as a printer, that forms an image on a media sheet conveyed by a sheet conveying unit using an inkjet or electrophotographic image forming unit is known.

A technique for controlling a motor(s) that drives a sheet conveying unit of such an image forming apparatus using a plurality of controllers is known. For instance, motor drive control may be performed using a master control unit and a slave control unit. The master control unit analyzes a control signal fed from a host controller and issues a command based on the control signal. The slave control unit controls a mechanical load, which is a control target, according to the command issued by the master control unit. Dividing the motor drive control to the master control unit and the slave control unit allows increasing the number of mechanical loads such as motors and sensors and reducing cost for the controllers that control the motors.

Meanwhile, to increase printing productivity of an image forming apparatus, it is required to control a sheet feed/conveyance system so as to convey sheets with narrow intervals between the sheets. Against the backdrop, Japanese Laid-open Patent Application No. 2002-284375 discloses a technique that causes a master control unit (engine control unit) to only schedule a next operation of a sheet feeding/conveying motor and causes a slave control unit (optional-apparatus control unit) to receive a signal from a position sensor that detects a sheet conveyance state and provides timing for the motor to perform the operation.

However, the conventional technique is disadvantageous in that delay can occur in motor operation. This is because timing control of the motor operation is executed by the master control unit by, as an interrupt detecting a state of the motor based on the signal output from the position sensor or the like and generating a control signal, and transmitting the control signal to the slave control unit.

More specifically, the master control unit receives a result of detection about the motor state from sensors or the like, and issues a command instructing the motor to perform an operation according to the received detection result. A period of time between when the detection result is received and when the command is issued undesirably becomes a time lag in the motor operation. This time lag can matter particularly greatly in such a situation as described above where a large number of sheets are consecutively conveyed with narrow intervals between the sheets.

In the technique disclosed in Japanese Laid-open Patent Application No. 2002-284375, while the master control unit schedules the next operation, the scheduled operation is performed after the master control unit carries out communications with the slave control unit according to the signal output from the position sensor. Accordingly, the technique cannot solve the disadvantage that the time lag, which depends the period of time from receipt of the signal of the position sensor to execution of the operation, occurs in the motor operation.

Therefore, it is desirable to reduce a time lag, which can occur when motor control is divided to a master control unit and a slave control unit, in motor operation.

SUMMARY OF THE INVENTION

It is an object of the present invention to at least partially solve the problems in the conventional technology.

According to an aspect of the present invention, there is provided a motor control device including: a first control unit that includes an issuing unit that issues a command that schedules a next operation of a motor according to an instruction from a controller; and a second control unit that includes a receiving unit that receives the command, a detecting unit that detects a state of the motor, a determining unit that makes a determination as to whether to drive the motor to perform the operation according to the state detected by the detecting unit, and an executing unit that drives the motor to perform the operation scheduled by the command as determined by the determination.

According to another aspect of the present invention, there is provided a motor control device including: a receiving unit that receives a command that schedules a next operation of a motor, the command being externally transmitted; a detecting unit that detects a state of the motor; a determining unit that makes a determination as to whether to drive the motor to perform the operation according to the state detected by the detecting unit; and an executing unit that drives the motor to perform the operation scheduled by the command as determined by the determination.

According to still another aspect of the present invention, there is provided a non-transitory computer-readable medium storing program codes that cause, when executed by a motor drive device, the motor drive device to perform a method including: receiving a command that schedules a next operation of a motor, the command being externally transmitted; detecting a state of the motor; making a determination as to whether to drive the motor to perform the operation according to the state detected by the detecting unit; and driving the motor to perform the operation scheduled by the command as determined by the determination.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
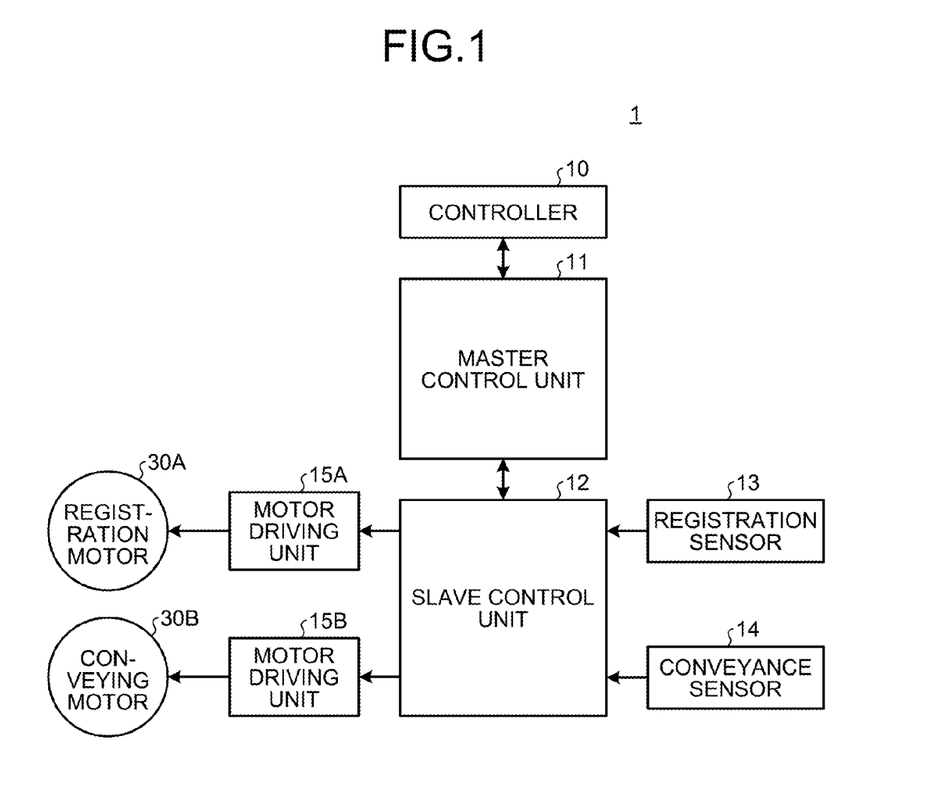
FIG. 1 is a block diagram illustrating an example of a configuration of a motor control system to which an embodiment is applicable.

Preferred embodiments of the present invention are described below with reference to the accompanying drawings. FIG. 1 illustrates an example of a configuration a motor control system 1 to which an embodiment is applicable. It is assumed hereinafter that the motor control system 1 according to the embodiment is used in a sheet conveyance system of an image forming apparatus, such as a printer or a multi function peripheral (MFP).

Referring to FIG. 1, the motor control system 1 according to the embodiment includes a master control unit 11 and a slave control unit 12. The motor control system 1 drives and controls motors including a registration motor 30A and a conveying motor 30B in the following manner. The master control unit 11 feeds an instruction to the slave control unit 12 according to a control signal from a controller 10. The slave control unit 12 controls motor driving units 15A and 15B based on the instruction fed from the master control unit 11 and output signals of sensors including a registration sensor 13 and a conveyance sensor 14.

The controller 10 issues an operation request according to a print instruction or the like that is entered by a user using an operation unit (not shown) provided on the image forming apparatus, for example.

The master control unit 11 includes a central processing unit (CPU), a read only memory (ROM), and a random access memory (RAM) and controls operations of the image forming apparatus according to a program, which is stored in the ROM in advance, by using the RAM as a working memory. The CPU of the master control unit 11 issues a command according to the operation request issued by the controller 10 and transmits the issued command to the slave control unit 12. The master control unit 11 controls printing operations of the entire image forming apparatus in this manner.

The master control unit 11 can issue a command that designates a next operation of a motor, which is a control target, according to an operation request from the controller 10. Hereinafter, this command that designates a next operation of the motor in advance is referred to as a schedule command that schedules the next operation of the motor. The schedule command contains, for instance, information designating a requirement that needs to be met to drive the motor according to the schedule command. For example, information indicating a state of the motor such as a position, a rotation angle, and a status of the motor can be used as this requirement.

The slave control unit 12 receives the command transmitted from the master control unit 11 and controls a mechanical load connected to the slave control unit 12 via an interface (not shown) according to the received command. In the example illustrated in FIG. 1, the slave control unit 12 is connected to the motor driving unit 15A that drives the registration motor 30A for controlling sheet registration and the motor driving unit 15B that drives the conveying motor 30B for sheet conveyance. The slave control unit 12 controls the motor driving units 15A and 15B according to the command fed from the master control unit 11, thereby performing drive control of sheet conveyance. The slave control unit 12 also receives output signals of the sensors including the registration sensor 13 that detects a sheet at a portion where the registration is performed and the conveyance sensor 14 that detects a position of the sheet in the conveyance system.

The master control unit 11 and the slave control unit 12 are embodied in independent hardware entities (e.g., an application specific integrated circuit (ASIC)). In the configuration described above, the single slave control unit 12 is connected to the single master control unit 11; however, an employable configuration is not limited thereto. Alternatively, a plurality of the slave control units 12 may be connected to the single master control unit 11.

Figure 2:
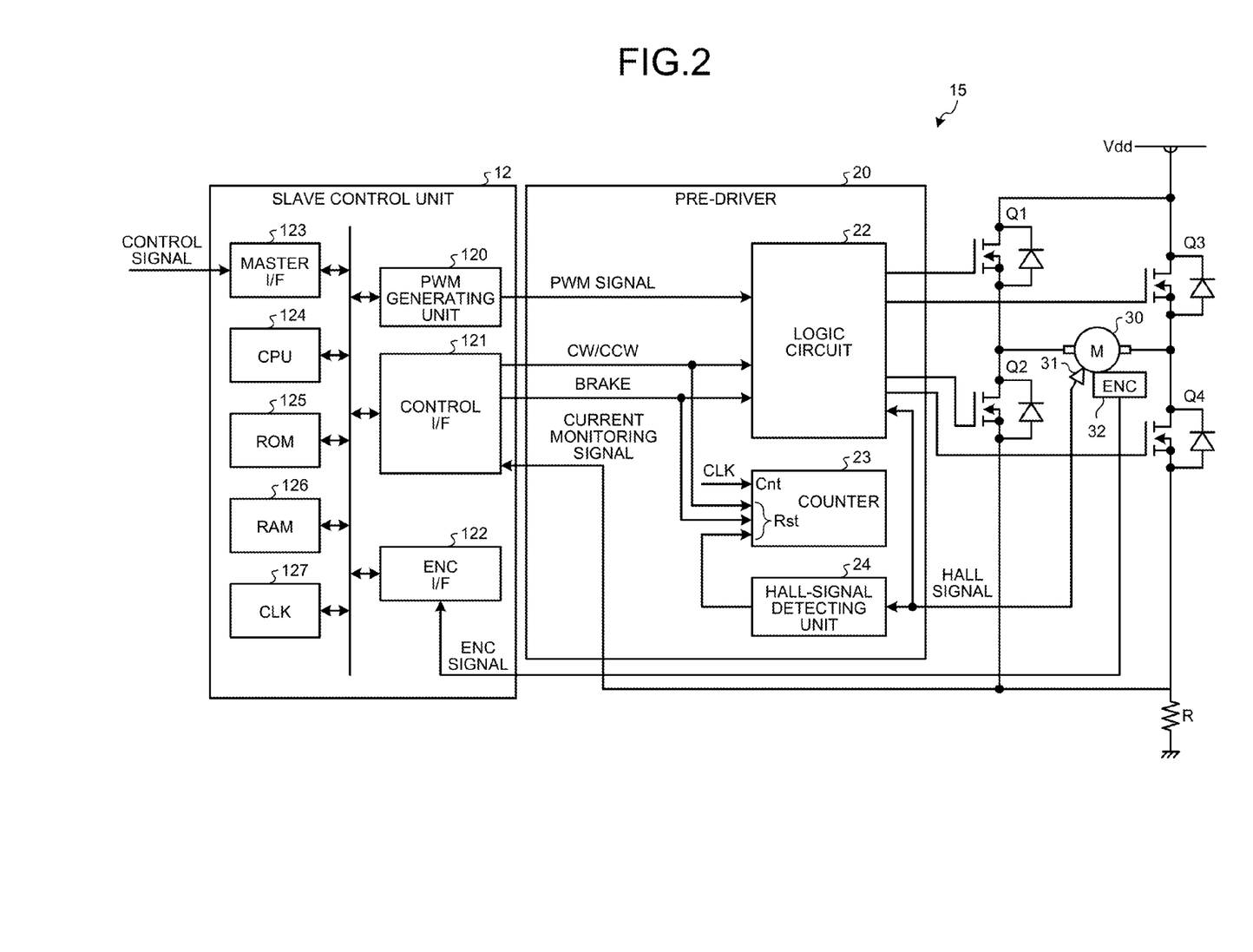
FIG. 2 is a block diagram illustrating an example of a configuration of a motor drive system including a slave control unit according to the embodiment.

FIG. 2 illustrates an example of a configuration of a motor drive system including the slave control unit 12. In FIG. 2, the motor driving unit 15 represents the motor driving units 15A and 15B illustrated in FIG. 1; the motor 30 represents the registration motor 30A and the conveying motor 30B.

The motor drive system controls rotation of the motor 30 by driving the motor 30 according to motor driving signals. The motor driving signals are output from a pre-driver 20 based on a drive control signal and an operation control signal generated by the slave control unit 12.

In the embodiment, the motor 30 is a brushless DC motor; the motor driving signals are pulse width modulation (PWM) signals. The motor 30 is not limited to a brushless DC motor; but can be a brush motor.

The slave control unit 12 includes a PWM generating unit 120, a control I/F 121, an encoder (ENC) I/F 122, a master I/F 123, a central processing unit (CPU) 124, a read only memory (ROM) 125, a random access memory (RAM) 126, and a clock generating unit (CLK) 127. These units are communicably connected to one another via a bus, for example.

The CPU 124 controls operations of the slave control unit 12 according to a program, which is stored in, for instance, the ROM 125 in advance, by using the RAM 126 as a working memory. The clock generating unit 127 generates a clock signal. The generated clock signal is internally used by the slave control unit 12 and also fed to units in the motor drive system via a path (not shown).

The master I/F 123 is an interface with the master control unit 11. The master I/F 123 receives a command for controlling driving of the motor 30 transmitted from the master control unit 11 and passes the command to the CPU 124. This command contains a target speed, a target position, and a rotating direction of the motor 30, a request to start the motor 30, a request to stop the motor 30, and/or the like. The command may be transferred from the master control unit 11 to the slave control unit 12 as a signal such as a pulse or as table information.

The PWM generating unit 120 generates pulse width modulation (PWM) signals with a duty cycle designated by the CPU 124. The control I/F 121 is an interface, via which control signals for driving and controlling the motor 30 are to be transmitted. The control I/F 121 outputs, for example, a clockwise/counterclockwise (CW/CCW) signal and a BRAKE signal generated by the CPU 124. The CW/CCW signal controls the rotating direction of the motor 30. The BRAKE signal is for braking control of the motor 30. The control I/F 121 also receives an input of a current monitoring signal for use in monitoring an electrical current passing through the motor 30.

An encoder signal (ENC signal) indicating a state of the motor 30 is output from an encoder (ENC) 32, which will be described later, and fed to the encoder I/F 122. The slave control unit 12 performs feedback control based on the command received from the master control unit 11 and the encoder signal fed from the encoder 32, and generates a drive control signal that is to be transmitted to the pre-driver 20.

The pre-driver 20 includes a logic circuit 22, a counter 23, and a Hall-signal detecting unit 24. The pre-driver 20 feeds the PWM signals output from the slave control unit 12 to the logic circuit 22. The pre-driver 20 also feeds Hall signals output from a Hall device 31 included in the motor 30, and the CW/CCW signal and the BRAKE signal output from the slave control unit 12 to the logic circuit 22.

The logic circuit 22 generates motor driving signals, which drive the motor 30, based on the PWM signals fed from the slave control unit 12, the Hall signals fed from the Hall device 31, and the CW/CCW signal and the BRAKE signal fed from the slave control unit 12. For example, the logic circuit 22 drives the motor 30 by applying three-phase (U, V, and W phases) motor driving signals. The Hall signals are also output as three-phase signals.

The motor 30 is driven at a rotation speed that depends on the duty cycle of the PWM signals output from the slave control unit 12. For instance, the motor 30 is rotated at its maximum speed when the duty cycle of the PWM signals is 100%, and stopped when the duty cycle is 0%.

The Hall-signal detecting unit 24 detects a change in the Hall signals output from the Hall device 31.

The counter 23 outputs a count value C, which is obtained by counting a predetermined clock, e.g., an internal clock CLK of the pre-driver 20. The counter 23 resets the counter value C upon receiving the CW/CCW signal or the BRAKE signal. Furthermore, the counter 23 resets the counter value C upon receiving a detection signal indicating that a change in the Hall signals is detected from the Hall-signal detecting unit 24.

The counter 23 compares the count value C against a threshold value $C_{th}$. When the count value C exceeds the threshold value $C_{th}$, the counter 23 determines that the motor 30 has entered a locked state, and outputs a locked-state detection signal, which indicates that the motor 30 is in the locked state, to the logic circuit 22. Upon receiving the locked-state detection signal, the logic circuit 22 shuts off supply of the motor driving signals that drive the motor 30 to the motor 30, thereby protecting the motor 30 and a driver circuit.

The motor 30 is driven by the driver circuit, which is an H-bridge circuit made up of switching devices Q1 to Q4 of field-effect transistors (FET), for example. In FIG. 2, a two-phase H-bridge circuit is illustrated as an example of the driver circuit for the sake of explanation. In an actual situation where the motor 30 is driven by a three-phase supply, another pair of upper and lower switching devices is added to the driver circuit for the motor 30.

The motor driving signals for the phase U, the phase V, and the phase W output from the logic circuit 22 are fed to gates of the switching devices Q1 to Q4. A motor driving voltage Vdd is fed to the driver circuit. The driving signals for these phases respectively control the switching devices Q1 to Q4 at certain timing, thereby causing the motor 30 to rotate.

The logic circuit 22 can control the rotating direction of the motor 30 between a first rotating direction and a second rotating direction by changing over an output destination of the three-phase motor driving signals and internally changing an order of the Hall signals according to the CW/CCW signal. The logic circuit 22 can also brake the motor 30 to a stop by, for instance, short-circuiting terminals of the motor 30 according to the BRAKE signal.

The Hall device 31 is incorporated in the motor 30 and outputs the Hall signals derived from analog signals responsive to a magnetic field intensity of the motor 30. The Hall signals output from the Hall device 31 undergo predetermined signal processing, such as amplification, in a signal processing circuit (not shown), and fed to the Hall-signal detecting unit 24 and to the logic circuit 22.

The encoder 32 detects a motor state and outputs encoder signals as a detection result. More specifically, the encoder 32 is provided on a shaft of the motor 30, for example, and outputs two-phase (phase A and phase B) encoder signals according to rotation of the motor 30. The encoder signals are fed to the slave control unit 12. The CPU 124 of the slave control unit 12 can monitor an amount of rotation, a rotation speed, and the rotating direction of the motor 30 based on the received encoder signals.

A position where the encoder 32 is arranged is not limited to on the shaft of the motor 30. Alternatively, the encoder 32 may be provided at a portion that moves in synchronization with a control target that is driven and controlled by the motor 30. The rotation speed of the motor 30 may be detected based on the Hall signals output from the Hall device 31 in lieu of the encoder signals output from the encoder 32. In this case, cost reduction can be achieved because the need of arranging the encoder 32 as a speed detection sensor is eliminated.

A resistor R is a shunt resistor that allows the slave control unit 12 to monitor a total electrical current flowing through the motor 30. A signal output by monitoring the electrical current using the resistor R is fed to the slave control unit 12.

Figure 3:
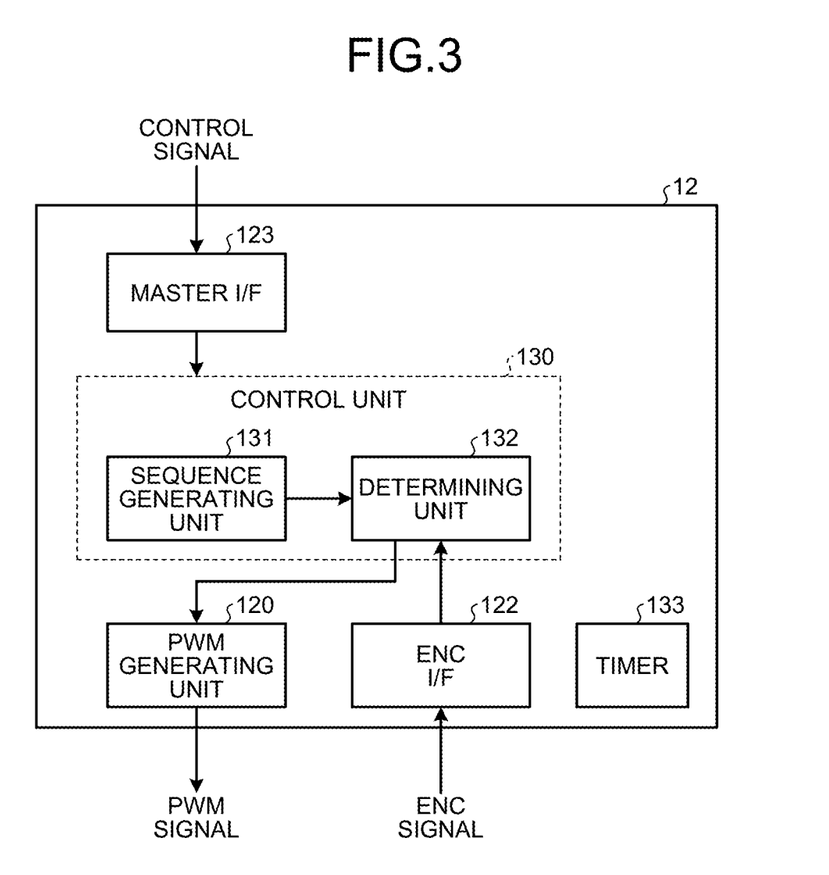
FIG. 3 is an example of a functional block diagram for describing functions of the slave control unit according to the embodiment.

FIG. 3 is an example of a functional block diagram for describing functions of the slave control unit 12. Portions in FIG. 3 corresponding to those in FIG. 2 described above are denoted by like reference numerals, and repeated descriptions are omitted.

The slave control unit 12 includes a timer 133 and a control unit 130 that includes a sequence generating unit 131 and a determining unit 132. The control unit 130 is implemented by a program running on the CPU 124. The timer 133 may also be implemented by running a program. The timer 133 measures time by counting the clock signal output from the clock generating unit 127. The sequence generating unit 131 generates a sequence that designates a motor operation according to a command fed from the master control unit 11.

The determining unit 132 determines whether or not to drive the motor 30 to perform the operation designated by the command issued by the master control unit 11. For instance, the determining unit 132 makes determination about a state of the motor 30 based on the encoder signals when the command issued by the master control unit 11 is a schedule command. When a result of the determination meets a requirement specified in the schedule command, the determining unit 132 drives the motor 30 according to the schedule command. The determining unit 132 also determines, for instance, which one of states in the sequence generated by the sequence generating unit 131 the state of the motor detected by the detecting unit is based on the encoder signals, and drives and controls the motor 30 as determined by the determination.

Control program for implementing the control unit 130 and the timer 133 is stored in, for example, the ROM 125 in advance. Alternatively, the control program according to the embodiment may be provided as being recorded in a non-transitory computer-readable storage medium such as a compact disk (CD), a flexible disk (FD), or a digital versatile disk (DVD) as a file of an installable format or an executable format.

The control program according to the embodiment may be configured so as to be stored in a computer connected to a network such as the Internet and provided by downloading over the network. The control program according to the embodiment may be configured so as to be provided or distributed over a network such as the Internet.

The control program to be run on the slave control unit 12 according to the embodiment has a module structure including the control unit 130, the timer 133, and the determining unit 132 included in the control unit 130. From viewpoint of actual hardware, the CPU 124 reads out the control program from the ROM 125 and executes the program, thereby loading the control unit 130, the timer 133, and the determining unit 132 included in the control unit 130 onto a main storage device (the RAM 126) to generate the control unit 130, the timer 133, and the determining unit 132 included in the control unit 130 on the main storage device.

Motor Drive Control According to Embodiment

Motor drive control performed by the motor control system 1 according to the embodiment is described below in more detail. To facilitate understanding, an example of motor drive control performed by a motor control system according to a conventional technique is described prior to description about the motor control system 1 according to the embodiment.

It is assumed that, according to the conventional technique, a master control unit that analyzes control signals fed from a host controller and issues a command and a slave control unit that controls a mechanical load according to the command fed from the master control unit are embodied in independent hardware entities. The master control unit makes determination based on sensor signals output from sensors. The command issued by the master control unit is held in a register as a control value. The slave control unit does not have a CPU, and controls the mechanical load such as a motor according to the control value held in the register.

Under the circumstances, the master control unit 11 determines a state of the mechanical load based on the signals output from the sensors, determines control to be executed on the mechanical load next based on the determined state, and issues a command for executing the control. Accordingly, a time lag occurs between when the motor 30 enters a predetermined state and when a next operation associated with the state is performed, resulting in control delay.

Figure 4:
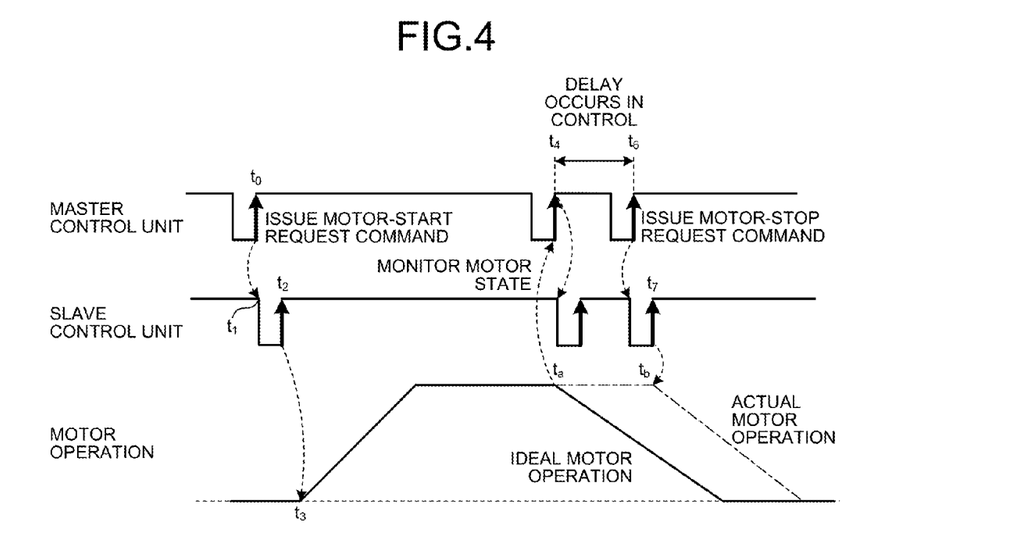
FIG. 4 is a timing chart illustrating an example of motor drive control in a motor control system according to a conventional technique.

FIG. 4 is a timing chart illustrating an example of motor drive control performed by the motor control system according to the conventional technique. A control signal instructing to start a motor, which is a mechanical load, is transmitted from a controller to a master control unit. For example, the control signal designates a speed (rotation speed) of the motor and a distance to be traveled by rotation of the motor (accumulated value of rotation angle).

The master control unit issues a start request command requesting to start the motor to the slave control unit at time $t_0$ according to the control signal from the host controller. The slave control unit receives the start request command at time $t_1$, and executes control according to the start request command at time $t_2$ at which, for example, a next clock signal rises. The motor is started at time $t_3$, which is later than time $t_2$. After a lapse of predetermined time since the motor is started, the motor reaches the speed designated by the start request command, for example.

The master control unit monitors a state of the motor based on the sensor signals output from the sensors and determines whether the motor has entered a state designated by the control signal fed from the controller. More specifically, the master control unit accumulates a rotation angle of the motor based on the encoder signals fed from the encoder, and determines whether a distance traveled by rotation of the motor has reached the designated travel distance designated by the control signal based on the accumulated rotation angle.

In this determination, the travel distance is preferably determined with a moving period in a decelerating period, during which the motor decelerates, taken into account. For example, the master control unit preferably calculates a distance traveled by rotation of the motor from when the motor starts decelerating to when the motor stops based on the rotation speed of the motor and acceleration, which is a known value, of the motor during the decelerating period. The master control unit determines whether the distance traveled by rotation of the motor has reached a distance that is obtained by subtracting the calculated travel distance during the decelerating period from the designated travel distance. Hereinafter, the distance obtained by subtracting the calculated travel distance during the decelerating period from the designated travel distance is referred to as "quasi-designated travel distance".

The master control unit executes control of stopping the motor when the distance traveled by rotation of the motor has reached the quasi-designated travel distance. An ideal operation of the motor in response to this stop control is such that, as illustrated in FIG. 4, the motor starts decelerating from time $t_a$ at which the distance traveled by rotation of the motor reaches the quasi-designated travel distance.

When, for instance, the master control unit that is monitoring the motor state makes a determination that the motor has entered the state designated by the control signal at time $t_4$, the master control unit issues a motor-stop request command instructing to stop the motor to the slave control unit. This motor-stop request command is issued at time $t_6$ after a delay, from time $t_4$ at which the determination is made, of a period of time that depends on internal processing of the master control unit. The slave control unit acquires this command at time $t_7$ at which the clock signal rises, for example, and performs control so as to stop the motor.

An actual operation of the motor in response to this stop control is such that deceleration starts from time $t_b$, which immediately follows time $t_7$ as indicated by an alternate long and short dash line in FIG. 4. Accordingly, the motor control causes a delay, that is, a difference between time $t_a$ at which deceleration starts in the ideal operation and time $t_b$ at which deceleration starts in the actual operation.

Drive control performed on the motor 30 by the motor control system 1 according to the embodiment is described below with reference to FIGS. 1 to 3. According to the embodiment, as described above, the slave control unit 12 is configured to include the CPU 124 and capable of, in addition to controlling the mechanical load (the motor 30), making determination based on the signals output from the sensors, generating a sequence according to a command fed from the master control unit 11, and the like. The master control unit 11 issues a command that schedules a next operation of the motor 30 according to a control signal from the controller 10 to the slave control unit 12.

Figure 5:
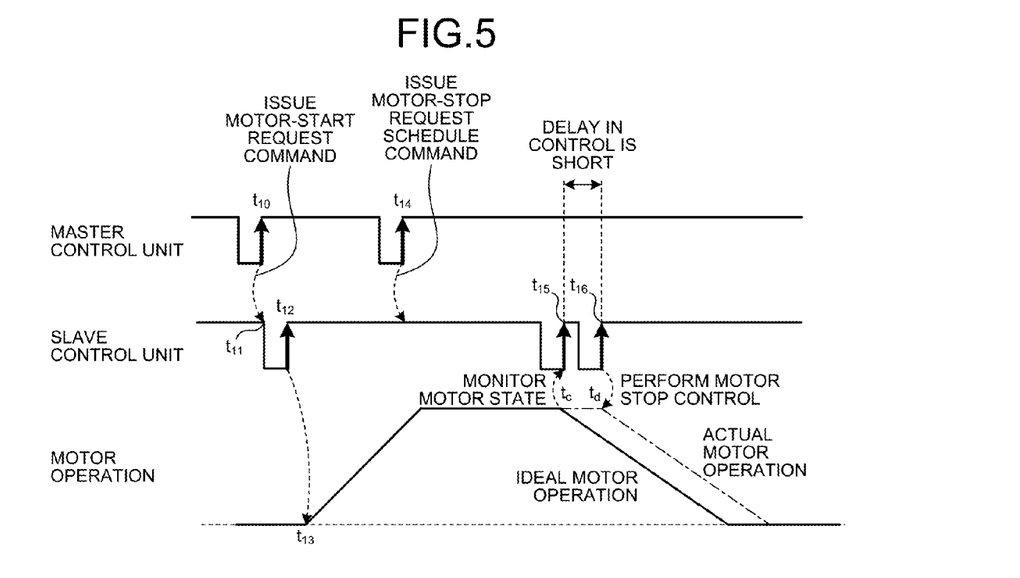
FIG. 5 is a timing chart illustrating an example of motor drive control according to embodiment.

FIG. 5 is a timing chart illustrating an example of the drive control performed on the motor 30 according to embodiment. As in the case illustrated in FIG. 4, the master control unit 11 issues a command requesting to start the motor 30 to the slave control unit 12 at time $t_{10}$ according to a control signal from the controller 10. The start request command includes, for instance, designation of a speed (rotation speed) of the motor 30. The slave control unit 12 receives the start request command at time $t_{11}$, and executes control according to the start request command at time $t_{12}$. The motor 30 is started at time $t_{13}$. After a lapse of predetermined period of time since the motor 30 is started, the motor 30 reaches the speed designated by the start request command.

The master control unit 11 issues a schedule command requesting to stop the motor 30 at time $t_{14}$, which is later than time $t_{10}$ at which the start request command requesting to start the motor 30 is issued, to the slave control unit 12. The schedule command is a command that schedules the slave control unit 12 in advance to execute control of stopping the motor 30 when, for instance, a state of the motor 30 meets a predetermined requirement. This schedule command is received by the slave control unit 12 and held in, for instance, the RAM 126. In this example, the schedule command designates, as the requirement of the state of the motor 30, a distance (accumulated value of rotation angle) traveled by rotation of the motor 30.

The slave control unit 12 monitors the state of the motor 30 based on the sensor signals output from the sensors and determines whether the state of the motor 30 has entered the state designated by the schedule command. More specifically, the determining unit 132 of the slave control unit 12 accumulates the rotation angle of the motor 30 based on the encoder signals fed from the encoder 32, and determines whether the distance traveled by rotation of the motor 30 has reached the designated travel distance designated by the schedule command based on the accumulated rotation angle.

In this determination, the travel distance is preferably determined with a moving period in a decelerating period, during which the motor 30 decelerates, taken into account as in the case described above. For example, the determining unit 132 of the slave control unit 12 preferably calculates the distance traveled by rotation of the motor 30 from when the motor 30 starts decelerating to when the motor 30 is stopped based on the rotation speed of the motor 30 and acceleration of the motor 30 during the decelerating period. The determining unit 132 determines whether the distance traveled by rotation of the motor 30 has reached a distance (quasi-designated travel distance) that is obtained by subtracting the calculated travel distance during the decelerating period from the travel distance designated by the schedule command fed from the master control unit 11.

Now assume that the distance traveled by rotation of the motor 30 has reached the quasi-designated travel distance at time $t_c$. The determining unit 132 of the slave control unit 12 monitors the state of the motor 30 based on the encoder signals from the encoder 32. When the determining unit 132 determines that the distance traveled by rotation of the motor 30 has reached the quasi-designated travel distance, the control of stopping the motor 30 is executed. An ideal operation of the motor 30 in response to this stop control is such that, as illustrated in FIG. 5, deceleration starts from time $t_c$ at which the distance traveled by rotation of the motor has reached the quasi-designated travel distance.

For instance, the CPU 124 of the slave control unit 12 determines, at time $t_{15}$, that the distance traveled by rotation of the motor 30 has reached the quasi-designated travel distance. After a delay that depends on internal processing of the slave control unit 12, the CPU 124 executes the control of stopping the motor 30 (time $t_{16}$). The stop control is executed as follows, for example. At time $t_{16}$, the slave control unit 12 controls the PWM generating unit 120 so as to generate PWM signals with a duty cycle of 0%; the CPU 124 outputs the BRAKE signal and supplies the BRAKE signal to the pre-driver 20 via the control I/F 121.

An actual operation of the motor in response to this stop control is such that deceleration starts from time $t_d$ which immediately follows time $t_{16}$ as indicated by the alternate long and short dash line in FIG. 5. Also according to the embodiment, the control executed on the motor 30 causes a delay, that is, a difference between time $t_c$, at which deceleration starts in the ideal operation, and time $t_d$, at which deceleration starts in the actual operation.

However, in contrast to the conventional technique illustrated in FIG. 4, according to the embodiment, the slave control unit 12 and the master control unit 11 do not exchange a command and the like concerning a monitoring result of the state of the motor 30. For this reason, the delay between time $t_c$ and time $t_d$ of the embodiment is shorter than the delay between time $t_a$ and time $t_b$ of the conventional technique. According to the embodiment, the time lag can be reduced to as small as twice a motor control cycle.

More specifically, according to the conventional technique described above, in a situation where the motor control system controls a plurality of motors, the master control unit receives sensor signals output from a plurality sensors that respectively monitor the plurality of motors. The master control unit makes determination about each of the sensor signals output from the plurality of sensors, and issues a plurality of control commands for controlling the plurality of motors, which are control targets, based on results of the determination.

In contrast, according to the embodiment, the slave control unit 12 includes the CPU 124, receives sensor signals output from sensors, and makes determination about the sensor signals. The master control unit 11 issues a command according to a control signal from the controller 10 and transmits the command to the slave control unit 12. Accordingly, even in a situation where the motor control system 1 controls a plurality of motors, the slave control unit 12 makes determination about each of the plurality of motors. Because multiple processing tasks are not concurrently assigned to one entity, delay time caused by each processing task can be shortened.

Furthermore, the master control unit 11 can issue and transmit a command as a schedule command to the slave control unit 12 in advance of time when an operation designated by the command is actually executed. As a result, assigning concurrent multiple command-issuing tasks is also prevented, and processing delay time can be shortened.

First Application Example of Embodiment

A first application example of the motor drive control according to the embodiment is described below. The first application example is an example, in which the motor control system 1 according to the embodiment executes triangular speed change control. The triangular speed change control is executed as follows. The motor 30 is accelerated in response to a start request or the like, and decelerated to a second target speed immediately when a first target speed is achieved.

The triangular speed change control according to the embodiment is described with reference to a timing chart illustrated in FIG. 6. The master control unit 11 issues a start request command requesting to start the motor 30 to the slave control unit 12. The start request command includes designation of the first target speed. The master control unit 11 also issues a speed-change request command including designation of the second target speed as a schedule command after issuing the start request command.

The slave control unit 12 receives the start request command from the master control unit 11 at time $t_{20}$. The start request command may further include designation of start delay time. Upon receiving the start request command, the determining unit 132 of the slave control unit 12 waits for the designated start delay time to elapse before starting the motor 30. Time is measured by the timer 133. Setting the start delay time in this manner not only prevents assigning concurrent multiple command-issuing tasks to the master control unit 11 but also prevents assigning concurrent multiple command-receiving tasks to the slave control unit 12.

Figure 6:
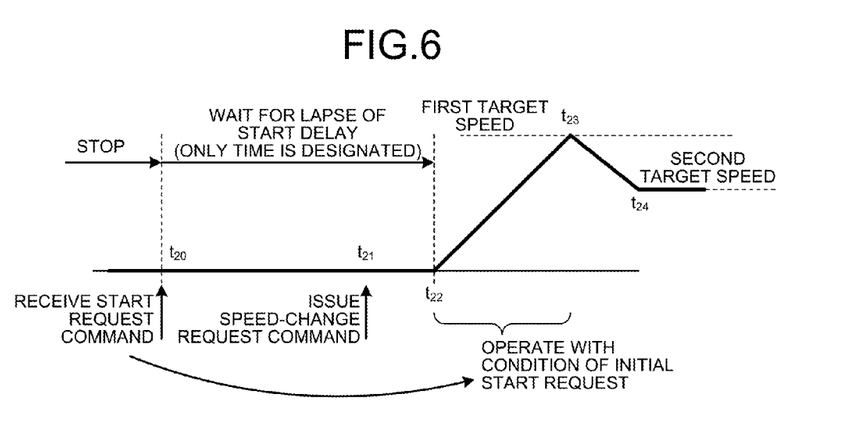
FIG. 6 is a timing chart for describing triangular speed change control according to the embodiment.

In the example illustrated in FIG. 6, at time $t_{21}$, which is within a period of the start delay time, the master control unit 11 issues a speed-change request command including designation of the second target speed to the slave control unit 12 as a schedule command. The second target speed is the speed, to which the speed of the motor 30 is to be changed. The sequence generating unit 131 of the slave control unit 12 generates a sequence for driving the motor 30 based on the first target speed and the second target speed.

For instance, the sequence generating unit 131 generates a sequence that sets an initial rotation speed of the motor 30 to the first target speed and, when the rotation speed of the motor 30 reaches the first target speed, changes the rotation speed to the second target speed.

The slave control unit 12 causes the motor 30 to start at time $t_{22}$ at which the start delay time has elapsed. The determining unit 132 determines whether the rotation speed of the motor 30 has reached the first target speed designated by the sequence generated by the sequence generating unit 131 based on the encoder signals fed from the encoder 32. When the rotation speed is determined to have reached the first target speed (time $t_{23}$), the control unit 130 drives the motor 30 at the second target speed in accordance with the sequence. When the determining unit 132 determines, at time $t_{24}$, that the rotation speed of the motor 30 has reached the second target speed, the determining unit 132 drives and controls the motor 30 so as to maintain the second target speed.

According to the conventional technique described above, motor control is executed as follows. The master control unit makes determination based on a sensor signal, and issues a command to the slave control unit based on a result of the determination. Accordingly, as described above, control delay is long, which makes it difficult to execute instantaneous speed change control involved in the triangular speed change control. By contrast, according to the embodiment, the slave control unit 12 itself directly drives and controls the motor 30 by using a sensor signal as a trigger. Accordingly, such instantaneous speed change control can be executed easily.

Second Application Example of Embodiment

A second application example of the motor drive control according to the embodiment is described below. The second application example is an example, in which the motor control system 1 according to the embodiment executes triangular drive control. The triangular drive control is drive control of causing a designated distance to be traveled in a shortest period of time. To execute the triangular drive control, the slave control unit 12 calculates a target speed and generates a sequence for driving the motor 30 based on the target speed. The target speed is such a speed that causes a designated travel distance to be traveled in a shortest period of time by accelerating the motor 30 to the target speed, and immediately thereafter decelerating the motor 30 to zero speed.

The triangular drive control according to the embodiment is described with reference to a timing chart illustrated in FIG. 7. The master control unit 11 issues a start request command including a designated travel distance, a stop mode, and acceleration to the slave control unit 12. The stop mode designates which one of schemes for stopping the motor 30 is to be used to stop the motor 30. The schemes include a scheme that uses the BRAKE signal, a scheme by switching off excitation, and a scheme by position holding. The slave control unit 12 receives the start request command from the master control unit 11 at time $t_{30}$. The start request command may further include designation of start delay time. The start delay time is delay time from when the start request command is received to when an operation designated by the received start request command is executed.

Figure 7:
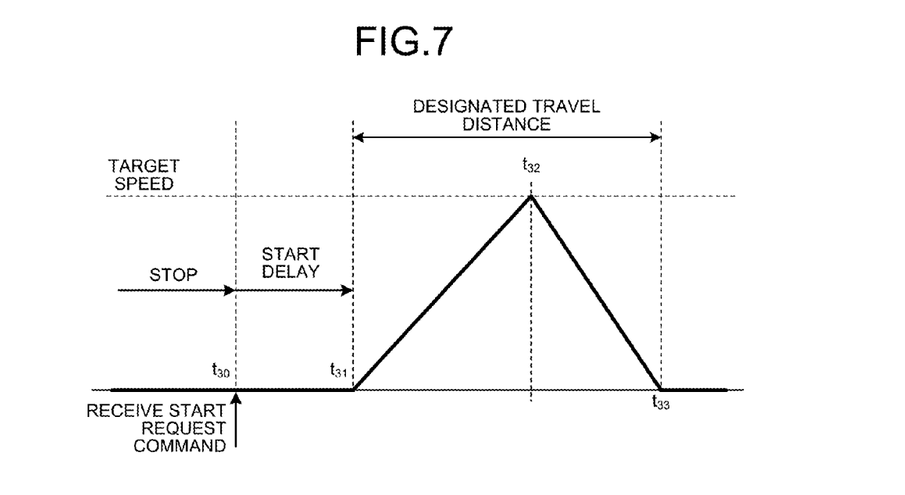
FIG. 7 is a timing chart for describing triangular drive control according to the embodiment.

In the example illustrated in FIG. 7, the sequence generating unit 131 of the slave control unit 12 implements the triangular drive control by generating sequence information for driving the motor 30 so as to travel the designated travel distance in a shortest period of time from time $t_{31}$ defined by the start delay time and thereafter stop.

More specifically, the sequence generating unit 131 calculates the target speed based on the designated travel distance, information indicating acceleration during an accelerating period of the motor 30, and information indicating acceleration during a decelerating period, in which the motor 30 decelerates in accordance with the stop control, contained in the start request command. The information indicating the acceleration during the accelerating period of the motor 30 and the acceleration during the decelerating period of the motor 30 may be contained in the start request command as described above; alternatively, the information may be stored in the ROM 125 in advance.

More specifically, the sequence generating unit 131 calculates the target speed that causes the designated travel distance to be traveled in a shortest period of time and causes the speed to drop to zero when the designated travel distance has been traveled based on the designated travel distance and the information indicating the acceleration and the acceleration during the decelerating period of the motor 30. For example, the sequence generating unit 131 generates a sequence that sets an initial rotation speed of the motor 30 to the target speed and, when the rotation speed of the motor 30 reaches the target speed, executes control that stops the motor 30. The generated sequence is stored in the RAM 126, for example.

The control unit 130 of the slave control unit 12 causes the motor 30 to start at time $t_{31}$ at which the start delay time has elapsed. The determining unit 132 determines whether the motor 30 has reached a predetermined state or, more specifically, whether the rotation speed has reached the target speed based on the encoder signals fed from the encoder 32. When the rotation speed is determined to have reached the target speed (time $t_{32}$), the control unit 130 executes the stop control of stopping the motor 30 according to the stop mode. The stop control is executed as follows, for example. At time $t_{32}$, the control unit 130 controls the PWM generating unit 120 so as to generate PWM signals with a duty cycle of 0%, and outputs the BRAKE signal. By this stop control, rotation of the motor 30 is stopped when the designated travel distance has been traveled (time $t_{33}$).

According to the conventional technique described above, motor control is executed as follows. The master control unit makes determination based on a sensor signal, and issues a command to the slave control unit based on a result of the determination. Accordingly, as described above, control delay is long, which makes it difficult to execute control of stopping the motor when the designated travel distance has been traveled. In contrast, according to the embodiment, the slave control unit 12 itself directly drives and controls the motor 30 by using a sensor signal as a trigger. Accordingly, traveling the designated distance can be controlled more accurately. In addition, according to the embodiment, stop control can be scheduled using only the start request command.

Third Application Example of Embodiment

A third application example of the motor drive control according to the embodiment is described below. The third application example is an example, in which the motor control system 1 according to the embodiment executes scheduled speed change control. The scheduled speed change control is executed as follows. A travel distance and a target speed of the motor 30 that is being driven at a fixed speed are designated. The rotation speed of the motor 30 is changed to the target speed. Thereafter, the motor 30 is automatically decelerated so as to stop when the designated travel distance has been traveled. To execute the scheduled speed change control, the slave control unit 12 generates a sequence for driving the motor 30 as follows. The speed, at which the motor 30 is being driven, is changed to the target speed, and thereafter the motor 30 is stopped when the designated travel distance has been traveled.

Figure 8:
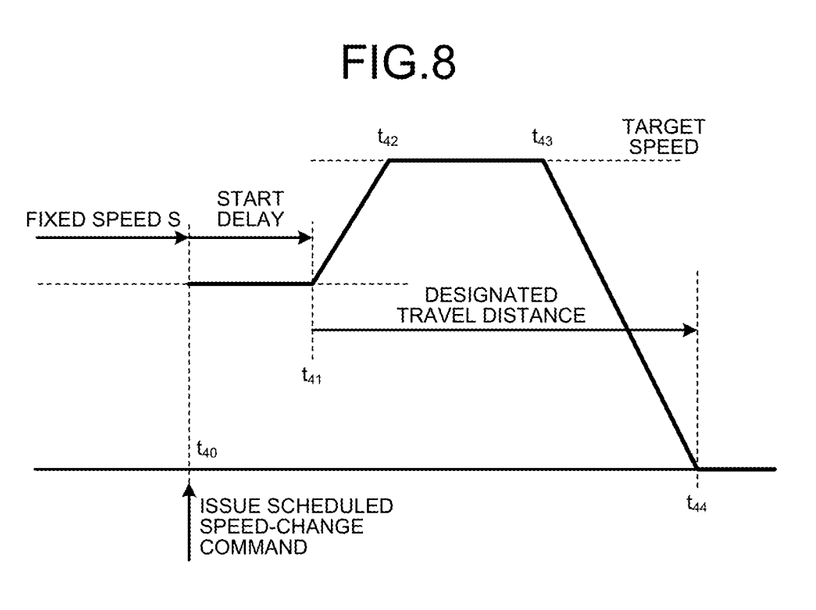
FIG. 8 is a timing chart for describing scheduled speed change control according to the embodiment.

The scheduled speed change control according to the embodiment is described with reference to a timing chart illustrated in FIG. 8. It is assumed that the motor 30 is already being driven to rotate at a fixed speed S. The master control unit 11 issues a speed change schedule command containing a designated travel distance and a target speed to the slave control unit 12. The slave control unit 12 receives the speed change schedule command from the master control unit 11 at time $t_{40}$. The master control unit 11 may cause the speed change schedule command to contain designation of start delay time.

Upon receiving the speed change schedule command, the sequence generating unit 131 of the slave control unit 12 generates a sequence for driving and controlling the motor 30 based on the designated travel distance and the target speed contained in the speed change schedule command. For example, the sequence generating unit 131 generates a sequence that sets an initial rotation speed of the motor 30 to the target speed and causes the designated travel distance to be traveled in the following manner. When the rotation speed of the motor 30 reaches the target speed, a calculation-result travel distance is traveled at the target speed, and thereafter control of stopping the motor 30 is executed. The calculation-result distance is calculated by subtracting a distance traveled in an accelerating period from the fixed speed S to the target speed and a distance traveled in a decelerating period from the target speed to "zero" speed from the designated travel distance. The generated sequence is stored in the RAM 126, for example.

The control unit 130 of the slave control unit 12 executes, on the motor 30, drive control of changing the rotation speed from the fixed speed S to the target speed in accordance with the sequence at time $t_{41}$, at which the start delay time has elapsed. When the determining unit 132 determines that the rotation speed of the motor 30 has reached the target speed at time $t_{42}$ based on the encoder signals, the control unit 130 controls and drives the motor 30 at the new target speed between time $t_{42}$ and time $t_{43}$ in accordance with the sequence. The control unit 130 starts deceleration from time $t_{43}$. This control causes rotation of the motor 30 to stop at time $t_{44}$ at which the designated travel distance has been traveled.

According to the conventional technique described earlier, motor control is executed as follows. The master control unit makes determination based on a sensor signal, and issues a command to the slave control unit based on a result of the determination. Accordingly, as described above, control delay is long, which makes it difficult to execute the control of stopping the motor when a designated travel distance has been traveled. In contrast, according to the embodiment, the slave control unit 12 itself directly drives and controls the motor 30 by using a sensor signal as a trigger. Accordingly, traveling the designated distance can be controlled more accurately.

In the embodiment described above, drive control of the motor is executed based on a result of determination made about the sensor signal (encoder signal). However, an employable control scheme is not limited thereto. More specifically, the embodiment can be implemented as open control that does not use a sensor signal. When implemented as open control, the encoder 32 and the encoder I/F 122 can be omitted.

Figure 9:
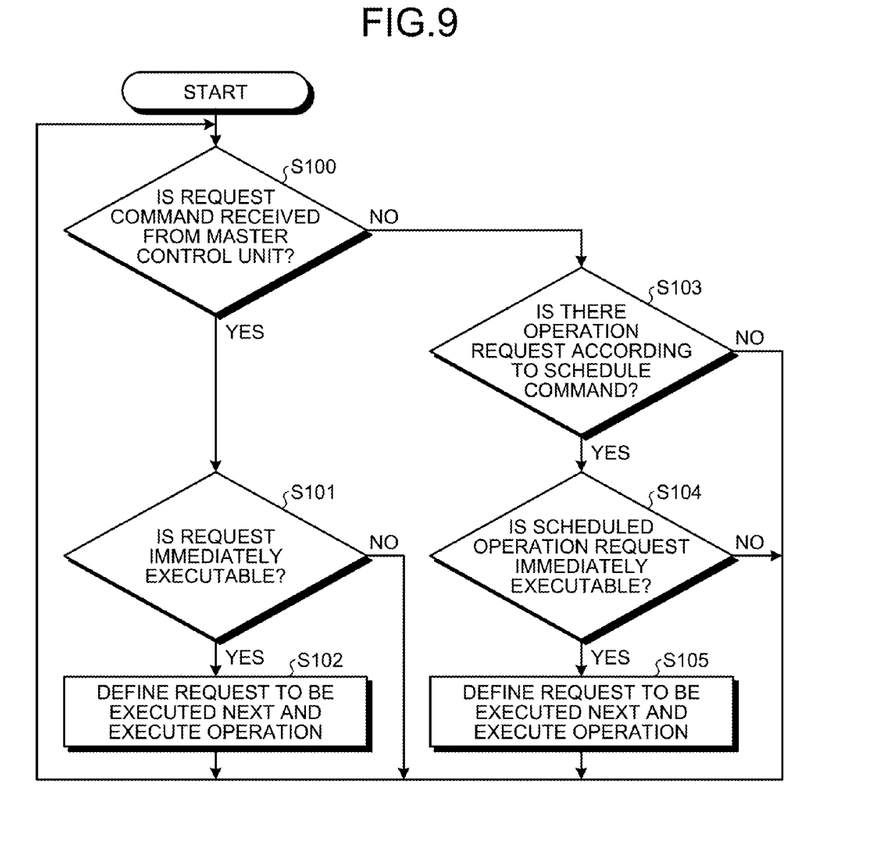
FIG. 9 is a flowchart illustrating an example of an operation procedure to be followed by the slave control unit according to the embodiment.

Operation Procedure to be Followed by Slave Control Unit According to Embodiment An example of operation procedure to be followed by the slave control unit 12 according to the embodiment is described below with reference to a flowchart illustrated in FIG. 9. The procedure of the flowchart illustrated in FIG. 9 is repeatedly performed at predetermined timing. In Step S100, the slave control unit 12 determines whether or not a request command is received from the master control unit 11.

If it is determined that a request command is received, the procedure goes to Step S101, where whether or not a request designated by the received request command is immediately executable. If it is determined that the request designated by the received request command is immediately executable, the procedure goes to Step S102. In Step S102, the slave control unit 12 defines the request designated by the request command received in Step S100 as a request to be executed next. The slave control unit 12 performs drive control of the motor 30 by executing an operation in accordance with the defined request, and causes the procedure to go back to Step S100.

If it is determined that the request command is not received from the master control unit 11, the procedure goes to Step S103. In Step S103, the slave control unit 12 determines whether or not there is an operation request designated by a schedule command. If it is determined that there is no such a request, the procedure goes back to Step S100.

If the slave control unit 12 determines that there is an operation request designated by a schedule command in Step S103, the procedure goes to Step S104. The slave control unit 12 determines whether or not the operation request designated by the schedule command is executable in Step S104. If it is determined that the operation request is not executable, the slave control unit 12 terminates the procedure, and causes the procedure to go back to Step S100. If it is determined that the operation request designated by the schedule command is executable, the procedure goes to Step S105. In Step S105, the slave control unit 12 defines the request designated by the schedule command as a request to be executed next. The slave control unit 12 performs drive control of the motor 30 by executing an operation in accordance with the defined request, and causes the procedure to go back to Step S100.

Example of Application to Image Forming Apparatus

Figure 10:
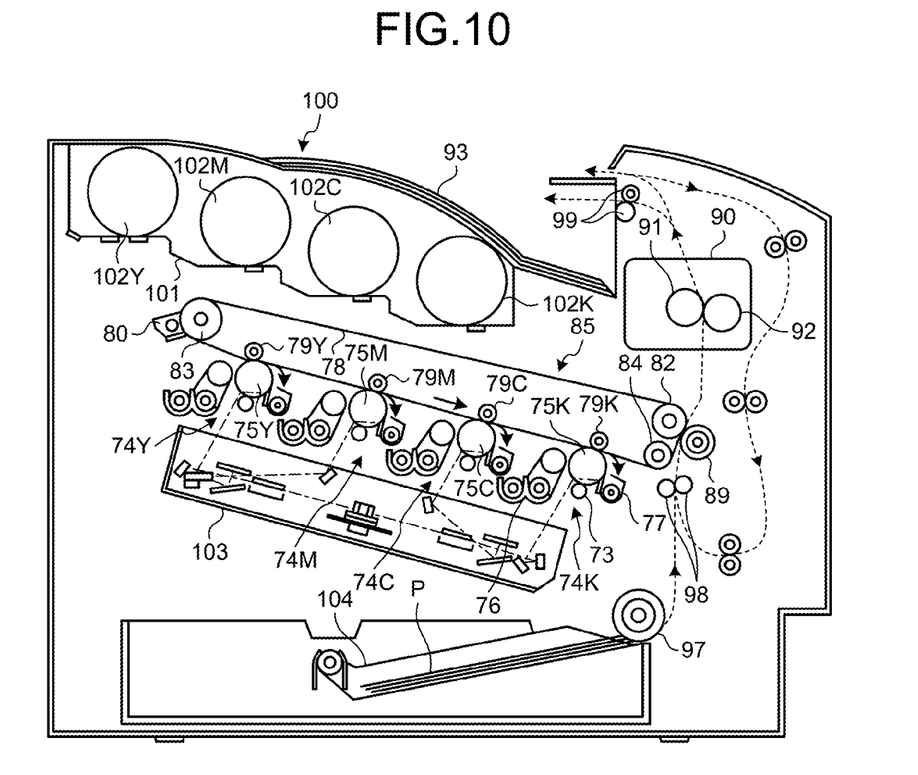
FIG. 10 is a diagram illustrating an example of a configuration of an image forming apparatus to which the motor drive system according to the embodiment is applicable.

An example, in which the embodiment is applied to an image forming apparatus, is described below. FIG. 10 is a diagram illustrating an example of a configuration of an image forming apparatus 100 to which the motor control system 1 according to the embodiment is applicable. The image forming apparatus 100 illustrated in FIG. 10 is a tandem color printer. A bottle container 101 is arranged at an upper portion of a body of the image forming apparatus 100. Four toner bottles 102Y, 102M, 102C, and 102K for different colors (yellow, magenta, cyan, and black) are detachably (replaceably) placed in the bottle container 101.

An intermediate transfer unit 85 is arranged below the bottle container 101. Image forming units 74Y, 74M, 74C, and 74K respectively associated with the colors (yellow, magenta, cyan, and black) are arranged in a manner to face an intermediate transfer belt 78 of the intermediate transfer unit 85.

Photosensitive elements 75Y, 75M, 75C, and 75K are arranged in the image forming units 74Y, 74M, 74C, and 74K, respectively. A charging unit 73, a developing unit 76, a cleaning unit 77, a neutralizing unit (not shown), and the like are arranged around each of the photosensitive elements 75Y, 75M, 75C, and 75K. The photosensitive elements 75Y, 75M, 75C, and 75K respectively perform an image forming process (a charging step, an exposure step, a developing step, a transfer step, and a cleaning process), thereby forming an image of a corresponding color on each of the photosensitive elements 75Y, 75M, 75C, and 75K.

The photosensitive elements 75Y, 75M, 75C, and 75K are driven to rotate clockwise in FIG. 10 by driving motors (not shown). The surface of the photosensitive element 75Y, 75M, 75C, 75K is uniformly electrostatically charged at a position of the charging unit 73 (the charging step).

Thereafter, the surface of the photosensitive element 75Y, 75M, 75C, 75K reaches a position where the surface is illuminated with laser light emitted from an exposing unit 103. Exposure scanning is performed at this position, whereby an electrostatic latent image of the corresponding color is formed on the surface (the exposure step).

Thereafter, the surface of the photosensitive element 75Y, 75M, 75C, 75K reaches a position where the surface faces the developing unit 76. The electrostatic latent image is developed at this position, whereby a toner image of the corresponding color is formed (the developing step).

Thereafter, the surface of the photosensitive element 75Y, 75M, 75C, 75K reaches a position where the intermediate transfer belt 78 faces a primary-transfer-bias-voltage applying roller (hereinafter, "primary-transfer bias roller") 79Y, 79M, 79C, 79K. The toner image on the photosensitive element 75Y, 75M, 75C, 75K is transferred at this position onto the intermediate transfer belt 78 (a primary transfer step). At this time, a slight amount of toner (hereinafter, "residual toner") that is not transferred is left on the photosensitive element 75Y, 75M, 75C, 75K.

Thereafter, the surface of the photosensitive element 75Y, 75M, 75C, 75K reaches a position where the surface faces the cleaning unit 77. The residual toner left on the photosensitive element 75Y, 75M, 75C, 75K is mechanically collected by a cleaning blade of the cleaning unit 77 (the cleaning step).

Finally, the surface of the photosensitive element 75Y, 75M, 75C, 75K reaches a position where the surface faces the neutralizing unit (not shown). Residual potential on the photosensitive element 75Y, 75M, 75C, 75K is neutralized at this position. A series of image forming operations performed on the photosensitive element 75Y, 75M, 75C, 75K is thus completed.

Thereafter, the toner images of the respective colors formed on the photosensitive element 75Y, 75M, 75C, 75K through the developing process are transferred onto the intermediate transfer belt 78 so as to be overlaid on one another. A multiple-color image (hereinafter, "color image") is thus formed on the intermediate transfer belt 78.

The intermediate transfer unit 85 includes the intermediate transfer belt 78, the primary-transfer bias rollers 79Y, 79M, 79C, and 79K, a secondary-transfer backup roller 82, a cleaning backup roller 83, a tension roller 84, and an intermediate-transfer cleaning unit 80. The intermediate transfer belt 78 is supported by and wound around the three rollers 82 to 84 in a tensioned manner and revolved in a direction indicated by an arrow in FIG. 10 by rotation of the roller 82 when the roller 82 is driven.

Each of the primary-transfer bias rollers 79Y, 79M, 79C, and 79K forms a primary transfer nip by sandwiching the intermediate transfer belt 78 between the primary-transfer bias roller 79Y, 79M, 79C, 79K and the photosensitive element 75Y, 75M, 75C, 75K. A transfer bias voltage that is opposite in polarity to toner is applied to the primary-transfer bias rollers 79Y, 79M, 79C, and 79K.

The intermediate transfer belt 78 runs in the direction indicated by the arrow to pass through the nips of the primary-transfer bias rollers 79Y, 79M, 79C, and 79K one by one. As a result, the toner images of the respective colors on the photosensitive elements 75Y, 75M, 75C, and 75K are transferred as primary transfer onto the intermediate transfer belt 78 and overlaid on one another.

Thereafter, the intermediate transfer belt 78, on which the toner images of the respective colors are transferred and overlaid on one another, reaches the position where the intermediate transfer belt 78 faces a secondary transfer roller 89. At this position, the secondary-transfer backup roller 82 forms a secondary transfer nip by sandwiching the intermediate transfer belt 78 between the secondary transfer roller 89 and the secondary-transfer backup roller 82. The toner images of the four colors formed on the intermediate transfer belt 78 are transferred onto a recording medium P that is conveyed to this secondary transfer nip position. At this time, residual toner that is not transferred onto the recording medium P is left on the intermediate transfer belt 78.

Thereafter, the intermediate transfer belt 78 reaches a position of the intermediate-transfer cleaning unit 80. The residual toner on the intermediate transfer belt 78 is collected at this position. A series of transfer operations performed on the intermediate transfer belt 78 is thus completed.

Meanwhile, the recording medium P is conveyed to the secondary transfer nip position from a sheet feeding unit 104 arranged at a lower portion of the image forming apparatus 100 via a sheet feeding roller 97, a pair of registration rollers 98, and the like.

More specifically, a plurality of sheets of the recording medium P, such as transfer paper, are contained and stacked in the sheet feeding unit 104. When the sheet feeding roller 97 is driven to rotate counterclockwise in FIG. 10, an uppermost sheet of the recording medium P is fed toward a nip between the pair of registration rollers 98.

The recording medium P conveyed by the pair of registration rollers 98 is temporarily stopped at the nip between the pair of registration rollers 98 that stops rotating. The pair of registration rollers 98 is driven to rotate with timing synchronized with the color image on the intermediate transfer belt 78 to convey the recording medium P toward the secondary transfer nip. The desired color image is thus transferred onto the recording medium P.

Thereafter, the recording medium P, onto which the color image is transferred at the position of the secondary transfer nip, is conveyed to a position of a fixing device 90. Heat and pressure are applied at this position by a fixing roller 91 and a pressing roller 92, causing the color image transferred onto the surface of the recording medium P to be fixed onto the recording medium P.

Thereafter, the recording medium P is discharged to the outside of the apparatus through a nip between a pair of sheet discharging rollers 99. The recording medium P discharged to the outside of the apparatus by the pair of sheet discharging rollers 99 is stacked on an stacking unit 93 as an output image one sheet by one sheet. The series of image forming operations in the image forming apparatus 100 is thus completed.

The motor 30 to be controlled by the motor control system 1 according to the embodiment can be used as a motor of a drive system that drives each roller of the pair of registration rollers 98 and rollers of the sheet conveyance system described above. As described above, the motor control system 1 according to the embodiment can reduce a time lag between control and actual operation as compared with a control system according to a conventional technique. Accordingly, the motor control system 1 can achieve control for conveying sheets with reduced intervals between the sheets at a higher speed.

According to an aspect of the present embodiments, it becomes possible to shorten a time lag in motor operation when motor control is divided to and performed by a master control unit and a slave control unit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor control device comprising:
    a first control unit configured to issue a start command requesting to start a motor and a schedule command such that the first control unit issues the schedule command instructing a next operation of the motor when the state of the motor reaches a set condition while operating based on the start command, and the schedule command includes the set condition; and
    a second control unit configured to output a control signal instructing the motor to perform the next operation when the state of the motor reaches the set condition while operating based on the start command such that the first control unit pre-instructs the second control unit to output the control signal in advance of the motor reaching the set condition and subsequent to issuance of the start command.

2. The motor control device according to claim 1, wherein the first control unit and the second control unit are embodied in independent hardware entities.

3. An image forming apparatus, comprising:
    the motor control device of claim 1; and
        an image forming unit that forms on a recording medium conveyed by the motor that is controlled by the motor control device.

4. The motor control device according to claim 1, wherein the schedule command is a command that schedules the second control unit in advance to execute control of stopping the motor when a state of the motor meets a set requirement.

5. The motor control device according to claim 4, wherein the schedule command designates, as the requirement of the state of the motor, a distance traveled by rotation of the motor.

6. The motor control device according to claim 4, wherein the second control unit is configured to monitor the state of the motor based on sensor signals output from sensors and determines whether the state of the motor has entered the state designated by the schedule command.

7. The motor control device according to claim 4, wherein the first control unit and the second control unit do not exchange a command relating to a monitoring result of the state of the motor.

8. The motor control device according to claim 1, wherein the second control unit includes:
    a receiving unit configured to receive the start command and schedule command from the first control unit;
    a determining unit configured to, when the receiving receives the schedule command after receiving the start command, determine whether the state of the motor has reached the set condition; and
    an executing unit configured to, when the determining unit is configured to determine that the state of the motor has reached the set condition, output the control signal instructing the next operation to the motor.

9. The motor control device according to claim 8, wherein the second control unit further includes a sequence generating unit configured to generate a sequence for designating the operation of the motor according to the command, and
    the executing unit is configured to drive the motor according to the sequence.

10. The motor control device according to claim 9, wherein the determining unit is configured to make the determination depending on which one of states in the sequence the state detected by a detecting unit.

11. The motor control device according to claim 9, wherein
    the first control unit is configured to issue the command that includes designation of a travel distance to be traveled by the operation of the motor, and
    the sequence generating unit is configured to generate, as the sequence, a sequence containing a target speed that is set based on the travel distance included in the command.

12. The motor control device according to claim 11, wherein the sequence generating unit is configured to generate, as the sequence, a sequence containing the target speed that is set so as to cause the travel distance to be traveled in a shortest period of time, during which a drive speed of the motor is increased from zero at which the motor is stopped to the target speed and then decreased to zero.

13. The motor control device according to claim 11, wherein the sequence generating unit is configured to generate, as the sequence, a sequence that contains a target speed that is set for the motor driven at a fixed speed, the sequence causing a drive speed of the motor to change from the fixed speed to the target speed and thereafter decrease to zero, at which the motor is stopped and the travel distance has been traveled.

14. The motor control device according to claim 8, wherein the determining unit is configured to accumulate a rotation angle of the motor, and is configured to determine whether a distance traveled by rotation of the motor has reached a designated travel distance designated by the schedule command based on the accumulated rotation angle.

15. The motor control device according to claim 14, wherein the travel distance is determined with a moving period in a decelerating period, during which the motor decelerates.

16. The motor control device according to claim 14, wherein the determining unit is configured to calculate the distance traveled by rotation of the motor from when the motor starts decelerating to when the motor is stopped based on the rotation speed of the motor and acceleration of the motor during the decelerating period.

17. The motor control device according to claim 14, wherein the determining unit is configured to determine whether the distance traveled by rotation of the motor has reached a distance that is obtained by subtracting the calculated travel distance during the decelerating period from the travel distance designated by the schedule command fed from the first control unit.

18. The motor control device of claim 1, wherein the second control unit is configured to,
   maintain the set condition in a memory device while operating the motor based on the start command, and
   output the control signal instructing the motor to perform the next operation when the state of the motor reaches the set condition while operating based on the start command.

19. The motor control device of claim 1, wherein the second control unit is configured to output the control signal instructing the motor to perform the next operation when the state of the motor reaches the set condition while operating based on the start command such that the second control unit receives the schedule command and performs the next operation without sending sensor information to the first control unit.

20. The motor control device of claim 1, wherein the second control unit is configured to output the control signal instructing the motor to perform the next operation when the state of the motor reaches the set condition while operating based on the start command such that, when the motor reaches the set condition, the second control unit performs the next operation without further instructions from the first control unit.

21. A non-transitory computer-readable medium storing program codes that cause, when executed by a motor drive device, the motor drive device to perform a method comprising:
   issuing, by a first control unit, a start command requesting to start a motor and a schedule command such that issuing issues the schedule command instructing a next operation of the motor when the state of the motor reaches a set condition while operating based on the start command, and the schedule command includes the set condition; and
   outputting, by a second control unit, a control signal instructing the motor to perform the next operation when the state of the motor reaches the set condition while operating based on the start command such that the first control unit pre-instructs the second control unit to output the control signal in advance of the motor reaching the set condition and subsequent to issuance of the start command.

22. The non-transitory computer-readable medium storing program codes according to claim 21, further comprising:
   receiving the start command and schedule command from the first control unit;
   determining, when the receiving receives the schedule command after receiving the start command, whether the state of the motor has reached the set condition; and
   outputting, during the determination of the state of the motor has reached the set condition, the control signal instructing the next operation to the motor.

* * * * *